United States Patent [19]

Oosterwal et al.

[11] Patent Number: 5,228,354

[45] Date of Patent: Jul. 20, 1993

[54] MULTISPEED, SHAFT-DRIVEN VEHICLE DRIVE

[75] Inventors: Dantar P. Oosterwal; Katherien L. Oosterwal, both of Cambridge, Mass.

[73] Assignee: Massachusetts Institute of Technology, Cambridge, Mass.

[21] Appl. No.: 882,411

[22] Filed: May 13, 1992

[51] Int. Cl.⁵ .......................... F16H 3/22; B62M 1/02
[52] U.S. Cl. ......................................... 74/347; 74/508;
74/594.2; 280/238; 280/260
[58] Field of Search ...................... 74/500.5, 504, 507,
74/508, 594.2, 347; 280/238, 260

[56] References Cited

U.S. PATENT DOCUMENTS

| | | | |
|---|---|---|---|
| 446,354 | 2/1891 | Kane | 280/260 |
| 479,470 | 7/1892 | Smallwood | 74/347 |
| 589,266 | 8/1897 | Nedland et al. | 74/347 |
| 614,969 | 11/1898 | Murphy et al. | 280/238 |
| 624,964 | 5/1899 | Oberhammer | 280/260 |
| 628,453 | 7/1899 | Delane | 280/238 |
| 2,378,634 | 6/1945 | Hussey | 280/260 |
| 3,863,503 | 2/1975 | Loeb et al. | 74/347 |
| 4,447,068 | 5/1984 | Brooks | 280/238 X |

Primary Examiner—Richard M. Lorence
Assistant Examiner—Benjamin Levi
Attorney, Agent, or Firm—Hamilton, Brook, Smith & Reynolds

[57] ABSTRACT

A multispeed, shaft-driven drive for a human propelled vehicle has a driving gear set of concentric ring gears, a driven gear set of concentric ring gears, a rotatable drive shaft having a pinion on each end and a control mechanism for moving the pinions axially of the shaft and into and out of engagement with selected ring gears.

10 Claims, 7 Drawing Sheets

MULTISPEED, SHAFT-DRIVEN VEHICLE DRIVE

FIELD OF THE INVENTION

This invention relates to shaft-driven, multispeed drives for human propelled vehicles and, more particularly, for vehicles such as bicycles, tricycles or the like.

BACKGROUND OF THE INVENTION

Whereas the present invention, which is embodied in a shaft-driven, multispeed drive, has utility in any vehicle where human pedal power is converted to rotary power for moving the vehicle, such as bicycles, tricycles, human driven airplanes, paddle boats, and the like, it has particular applicability to bicycles.

The first bicycle, or more precisely, velocipede, was probably invented in France in 1880 by Baron von Drais and the invention was described at that time as: "The principle of the invention consists in the simple idea of a seat upon two wheels propelled by the two feet acting on the ground". The rider, or more correctly, the walker, straddled a board supported by two wheels and sat on a seat just high enough that his feet could touch the ground to take steps. Because of its similarity to a hobby horse, the bicycle was nicknamed the Dandy-horse.

It also appears that pedals or cranks were next attached to the front wheels of bicycles. Subsequently, the "Ordinary" bicycle came into use in 1870. It had india rubber wheels, pedals on the front wheel which was substantially larger than the rear wheel.

The first rear drive bicycle was developed in 1879 by H. J. Lawson (the Safety Bicycle). It was the first bicycle to have its rear wheel driven by a chain from a pedal-driven crank located on a separate axle beneath the seat.

At this time, most bicycles were made in Europe. In 1885, the Pope Manufacturing Company of Hartford, Conn. displayed an American made bicycle at a trade show in London. This was the first bicycle to use a shaft drive. It was patented in 1885 and employed a bevel gear shaft instead of a chain to power the rear wheel. The idea caught on quickly because the bicycle was successfully used in races of that day. Many chainless models were made during the 1890's, but cost twice as much as bicycles driven with chains. Despite the fact that chain drives are far less efficient than direct or shaft drives, their price differential virtually drove the shafts from the market.

Subsequently, popularity of the bicycles, which at one time were important modes of transportation waned because of the development of the automobile for mass transportation. In the 1970's, bicycle popularity again rose because of interest in fitness, antipollution and the development of the variable speed bicycle also known as the "10-speed".

The concept of using a shaft drive instead of a chain drive has some inherent advantages that make it very desirable. One advantage stems from the fact that the greasy chain is eliminated. Since the chain is eliminated, so is the problem of brushing against it and getting grease on the rider's clothing or getting the rider's clothing caught in the chain. Also eliminated is the problem of the chain jumping off the sprockets as with present day derailers.

The most significant advantage of the bicycle shaft drive is the improved efficiency of the system over a conventional chain drive. The shaft drive of the present invention is estimated to be 90-95% efficient compared to a conventional chain drive that is only 50-70% efficient. This efficiency calculation also assumes that the chain drive is properly maintained and greased, which from casual observation of the average bicycles on the street is not the case.

With regard to multispeed bicycles, the shaft drive affords the opportunity to include brakes that are applied by backpedaling (coaster brakes) similar to brakes used on single speed children's bikes. Coaster brakes are possible because the shaft drive can transmit force when pedaling forwards or backwards. A shaft drive also allows direct drive similar to what single speed track bikes use. This direct drive feature is particularly advantageous for mountain bikes that are used for riding on trails because direct drives allow the rider better control of the bike. A multispeed shaft drive could, therefore, be mounted on a coaster brake hub, a direct drive hub, a ratchet hub, or a hub that combines more than one of these options. The aesthetic appeal of the shaft drive is also an advantage due to the uncluttered "high tech" and aerodynamic appearance.

On Feb. 4, 1975, U.S. Pat. No. 3,863,503 was issued to David C. Loeb et al. It disclosed a shaft-driven bicycle that was multispeed and shiftable throughout a series of gear ranges. It employed a series of ring gears rotated by the pedals and a second series of ring gears secured to the rear axle. A telescoping drive shaft had pinions on each end which were engageable with each of the sets of ring gears.

The patent acknowledged that because of the radial expansion of the gear rows in each set of concentric ring gears, an unavoidable deviation resulted in the spaces between the teeth (actually rectangular projections) of the innermost rows of teeth. It was suggested that the radial length of the teeth could be reduced. The teeth could be shaped so that the circumferential space between the teeth remained constant. However, if the spaces remain constant, the teeth of each ring gear would vary in size from ring to ring and could not engage the pinion, which had teeth of constant size and spacing. Conversely, if the teeth remained the same size, the spaces between them in the outermost ring would be greater than the spaces between them in the innermost ring and the pinion would, obviously, not engage in the spaces but would skip.

It is to the problems encountered by this construction that the present invention is directed.

SUMMARY OF THE INVENTION

The invention is embodied in a shaft-driven, multispeed drive for a human propelled vehicle such as a bicycle, tricycle, airplane or boat but is herein illustrated as the drive of a bicycle.

The mechanism has a driving gear set, comprising a plurality of concentric ring gears operatively connected to a conventional pedal driven crank. A driven gear set also having a plurality of concentric ring gears is operatively secured to the vehicle's drive wheel, in this case, a bicycle's rear wheel. The teeth of each ring gear are identically sized and uniformly spaced, but each concentric ring has a different number of teeth.

There is a rotatable drive shaft mechanism secured to the frame including a shaft having a pinion on each end. Each of the pinions is mounted for movement axially along the drive shaft for selective engagement, one each, with the ring gears of the driving gear set and the driven gear set, respectively. One pinion is located near the pedal hub and the other pinion is located near the hub of the rear wheel.

A pinion control mechanism mounts each pinion for movement independently of the other pinion in a direction transversely of the axis of rotation of the drive shaft into and out of engagement with each ring gear of the associated set. That is, the front pinion is moved into and out of engagement with the ring gears attached to the pedals, and the other pinion is selectively engageable and disengageable with each of the ring gears associated with the rear wheel.

The pinion control means located at each end of the drive shaft and is, in effect, a drive shaft control means so that the drive shaft, including the pinion is moved toward and away from the teeth of the associated gear set to engage and disengage the pinion from the teeth of the selected ring gear, thus avoiding stripping of the teeth while the pinions are being shifted.

The pair of pinion shifting members accomplish the dual function of moving the drive shaft toward and away from the ring gears as well as for shifting the pinion along the drive shaft to engage a selected ring gear after the pinion has been disengaged from a previous ring gear.

The above and other features of the invention including various and novel details of construction and combinations of parts will now be more particularly described with reference to the accompanying drawings and pointed out in the claims. It will be understood that the particular multispeed, shaft-driven drive embodying the invention is shown by way of illustration only and not as a limitation of the invention. The principles and features of this invention may be employed in varied and numerous embodiments without departing from the scope of the invention.

DETAILED DESCRIPTION

Figure 1:
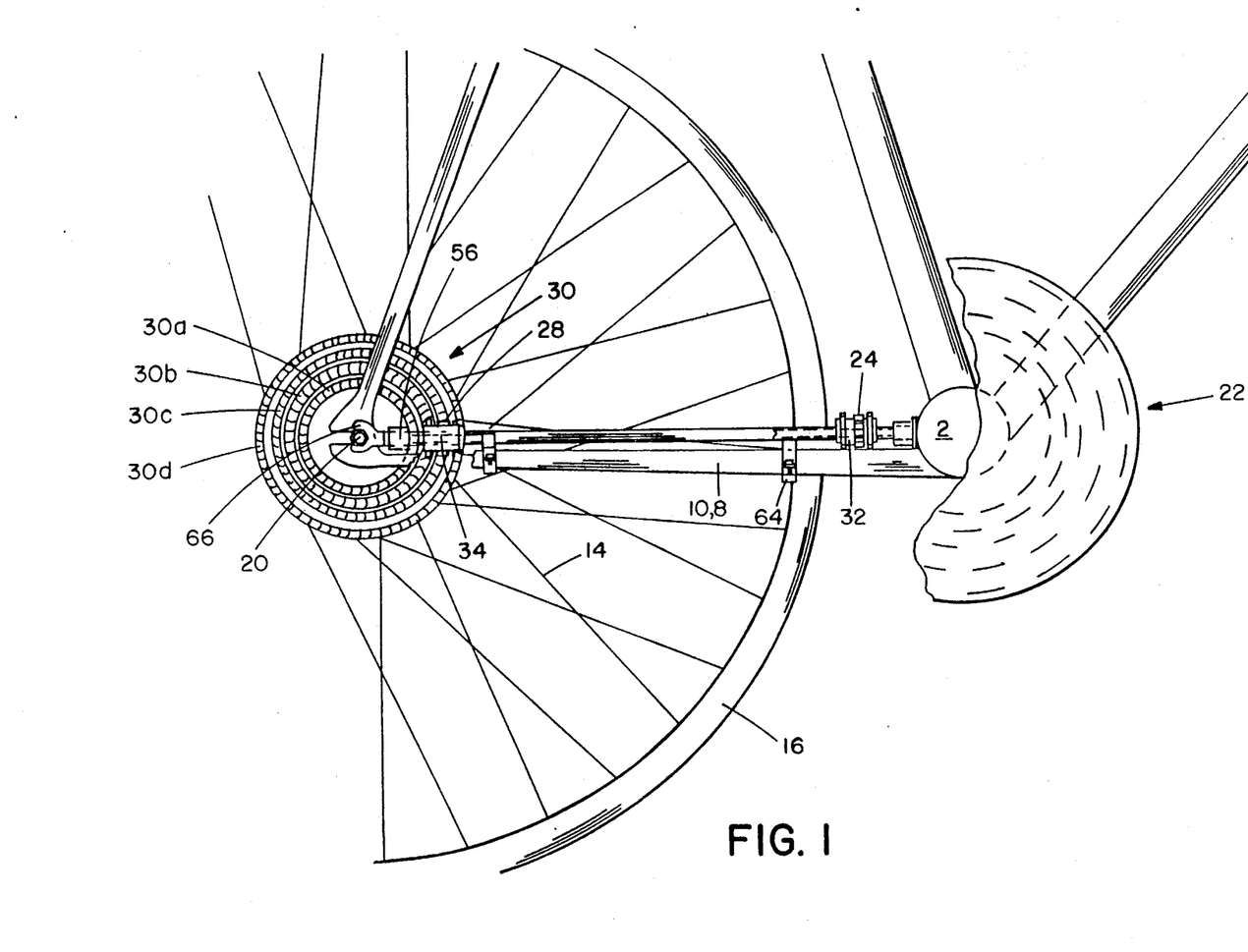
FIG. 1 is a side elevation of a rear portion of a bicycle equipped with a multispeed, shaft-driven drive embodying the present invention.
Figure 2:
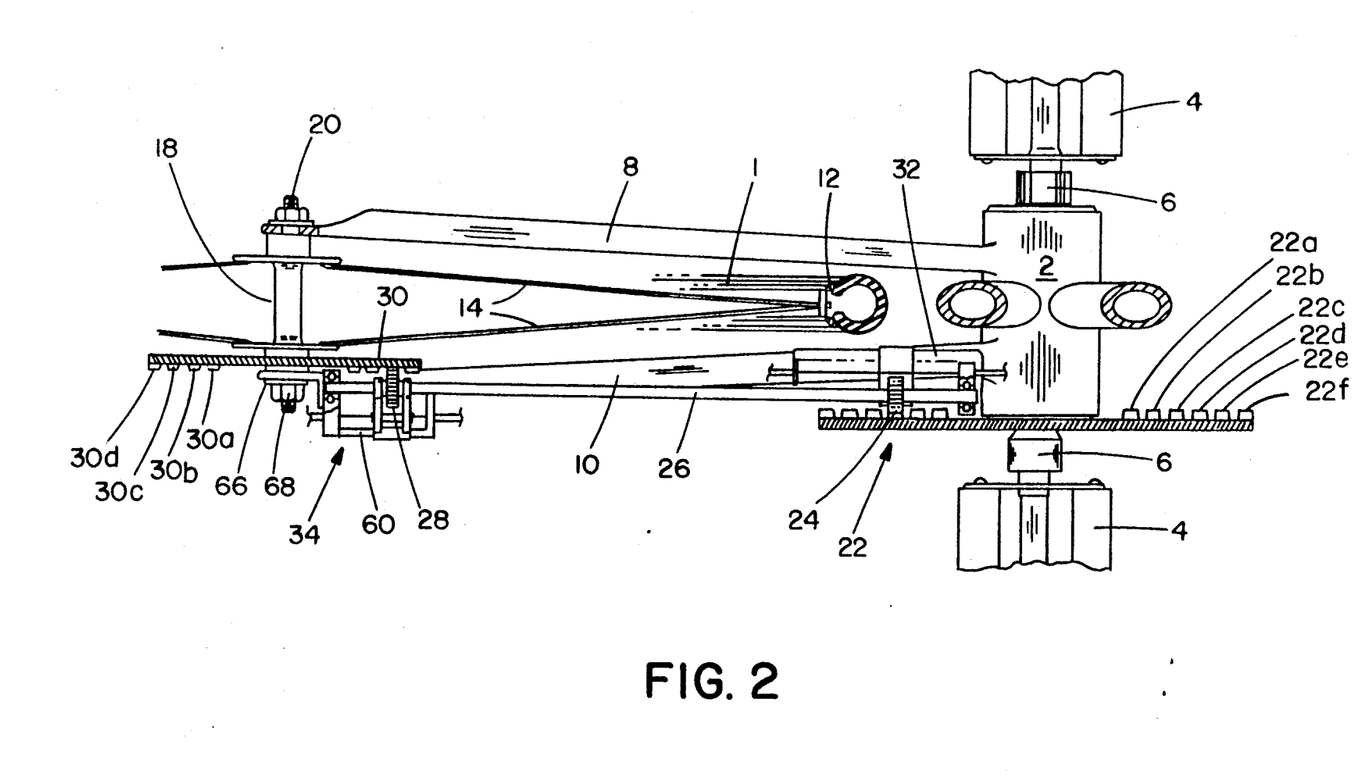
FIG. 2 is a plan view, with certain elements in section and others broken away for clarity, of the portion of the bicycle shown in FIG. 1.

The invention will be seen in FIGS. 1 and 2 as embodied in a conventional bicycle, although it may be embodied in any human propelled vehicle where rotary motion from pedals is transmitted to a driving mechanism such as a wheel or propeller.

The bicycle, only the rearward portion of which is seen in the figures, includes a hub (bottom bracket) 2, pedals 4 (FIG. 2), pedal crank levers 6, left and right frame members (chain stays) 8 and 10, respectively, a wheel 12 having spokes 14, a pneumatic tire 16 and a rear wheel hub 18 which rotates on a conventional shaft 20. The rear wheel, if desired, may include a coaster brake (not shown).

The multispeed drive mechanism includes a driving gear set, generally designated 22, which has a plurality of concentric ring gears 22a, 22b, 22c, 22d, 22e and 22f (FIG. 2), and which will be described in greater detail hereinafter. A gear pinion 24 is slidably mounted on a splined rotatable drive shaft 26. The opposite end of the drive shaft 26 slidably mounts a pinion 28 which is engageable with a driven gear set generally designated 30 having a plurality of concentric ring gears 30a, 30b, 30c and 30d.

It should be emphasized that the multispeed, shaft driven drive made in accordance with the present invention can be bolted directly to any bicycle such as a road racer or an all-terrain bike merely by removing the existing chain and sprockets and replacing them with the gears and drive shaft.

Each of the pinions 24 and 28 are operated by pinion control mechanisms 32 and 34. The members 32 and 34 are identical and may also be referred to as the drive shaft control means or the pinion shifting members since both members serve all of these functions.

The drive shaft 26 has circumferentially spaced splines 40, each of which receives a ball bearing 42 (FIG. 5) which also rides in a spline 44 in a hub 46 to which the pinion 28 is secured. The hub 46, in turn, is journaled in ball bearings 48, mounted in brackets 50. By this construction, torque is transmitted from the drive shaft 26 to the pinion 28 by way of the spline connection with the hub 46 which, in turn, is free to rotate in the brackets 50. Also by this construction, the pinion 28 and the hub 46 are free to move axially of the drive shaft 26 on the ball bearings 42 in the splines 40 and 44.

Figure 3:
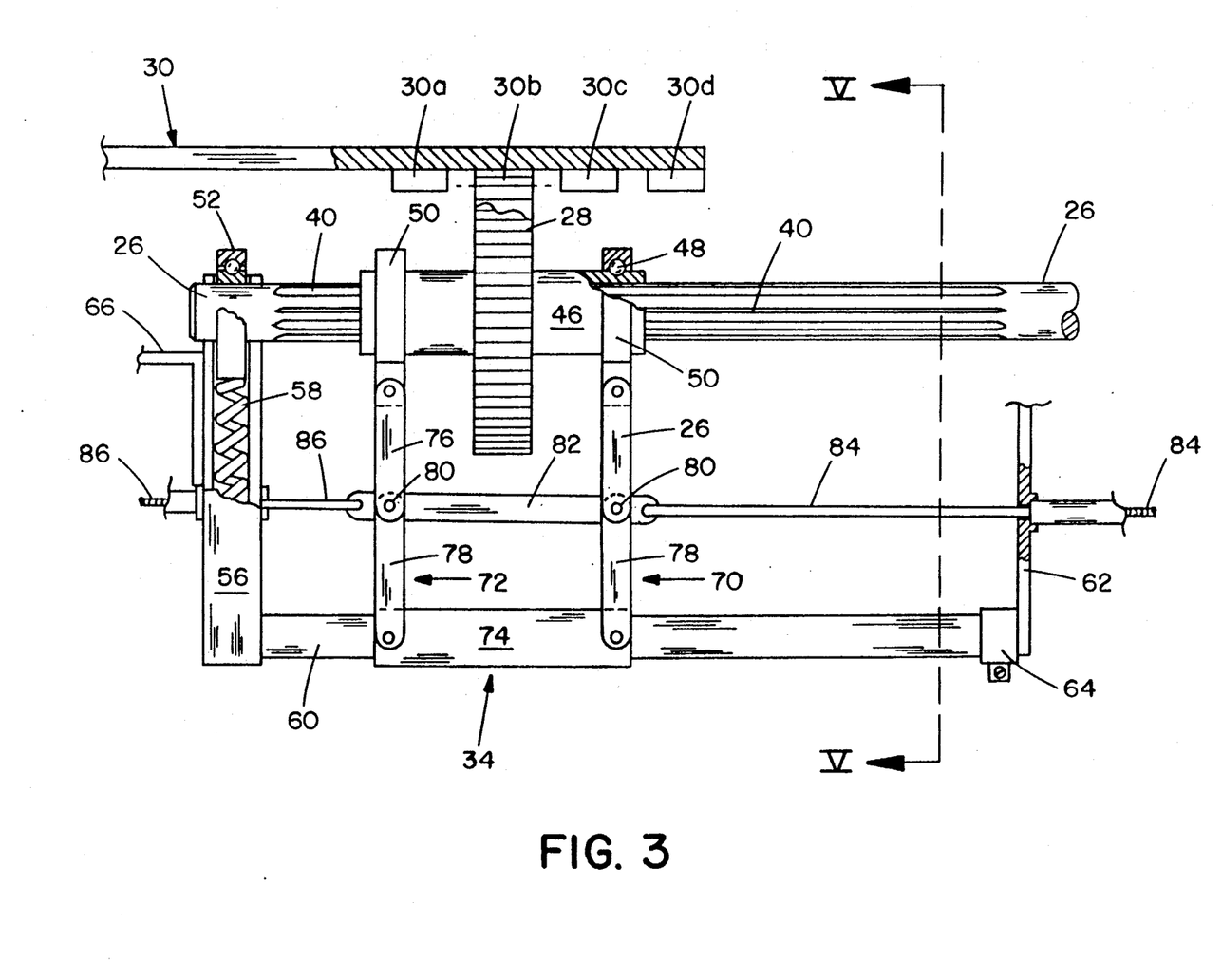
FIG. 3 is a plan view of a mechanism for mounting the drive shaft and for moving the pinion into and out of engagement with the teeth of a selected ring gear.
Figure 6:
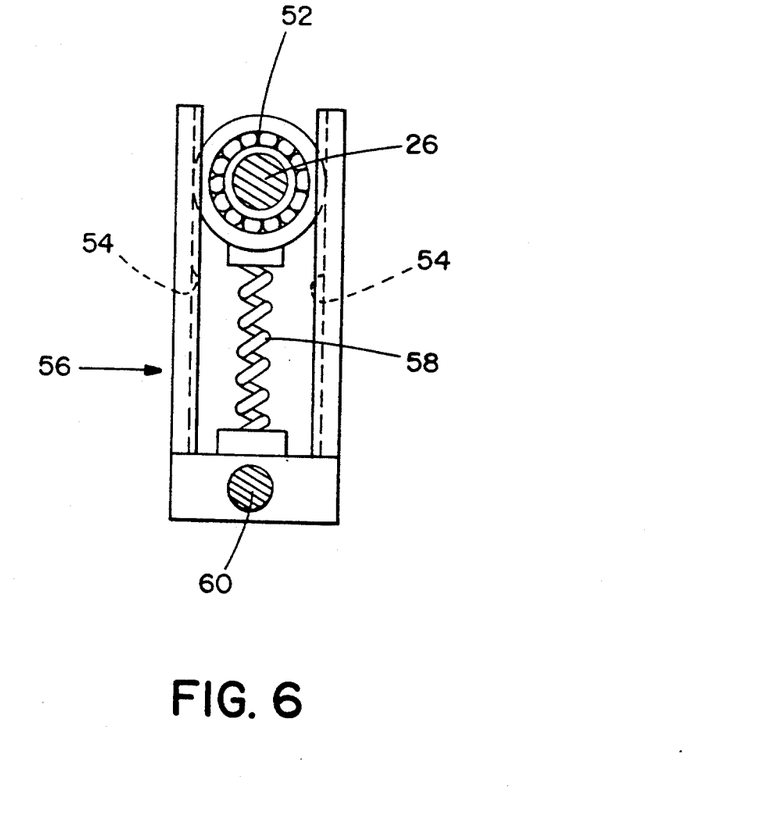
FIG. 6 is a detailed view of part of the drive shaft mounting mechanism.

As will be seen in FIGS. 3 and 6, the free end of the drive shaft 26 is journaled in a bearing 52 held in guideways 54 in a U-shaped guide 56 against the force of a compression spring 58. As viewed in FIG. 6, the spring 58 urges the bearing 52 and, hence, the drive shaft 26 upwardly.

A rod 60 projects from the bottom of the U-shaped guide 56. The other end of the rod is received in a guide plate 62 having a bracket 64 which is removably secured to the bicycle frame member 10. A second bracket 66 secured to the U-shaped guide 56 is removably secured to the axle 20 of the rear wheel by a nut 68 (FIG. 2). An equivalent bracket holds the member 32 to the pedal hub 2.

Figure 5:
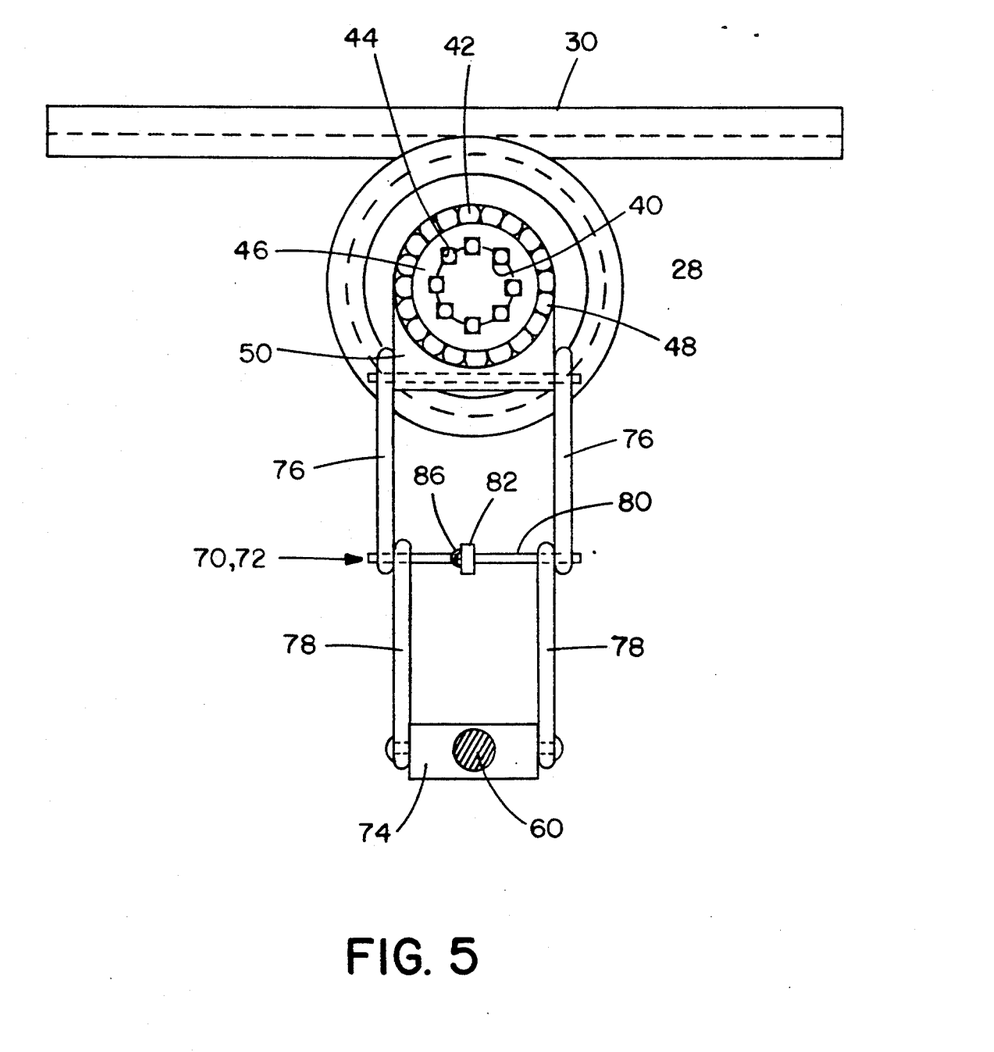
FIG. 5 is a sectional view of the mechanism taken on the line V—V of FIG. 3.

As seen in FIGS. 3 and 5, a pair of H-shaped toggles 70, 72, are pivoted on the brackets 50 and on a sleeve 74 which slides on the rod 60. The toggles have upper arms 76 and lower arms 78 pivotably joined by a pin 80. The toggle members are joined at their centers by a link 82 to one end of which is secured a Bowden cable 84 and to the opposite end of which is secured another Bowden cable 86. The cables lead to controls (not shown) on or near the handlebars of the bicycle.

Figure 7:
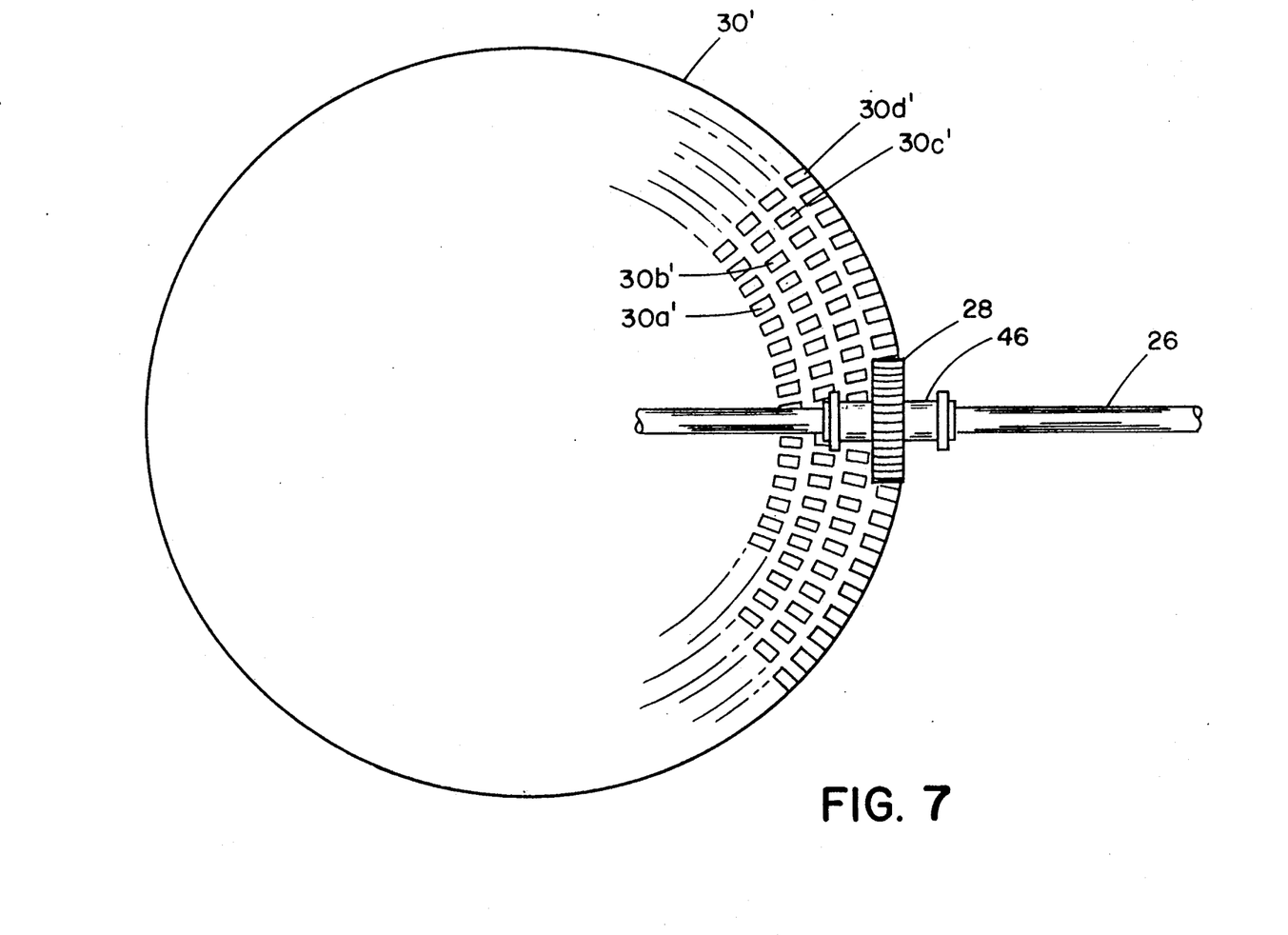
FIG. 7 is a side view of a ring gear set but illustrating the use of helical gears.

Referring briefly to FIG. 7, there will be seen a driven gear 30' having a set of at least four concentric ring gears 30a', 30b', 30c', 30d'. These are helical gears, whereas the gears shown in the other figures are straight gears. The type of gears are immaterial to the theoretical carrying out of the invention, but are herein shown to illustrate that helical gears may be used if desired.

Figure 4:
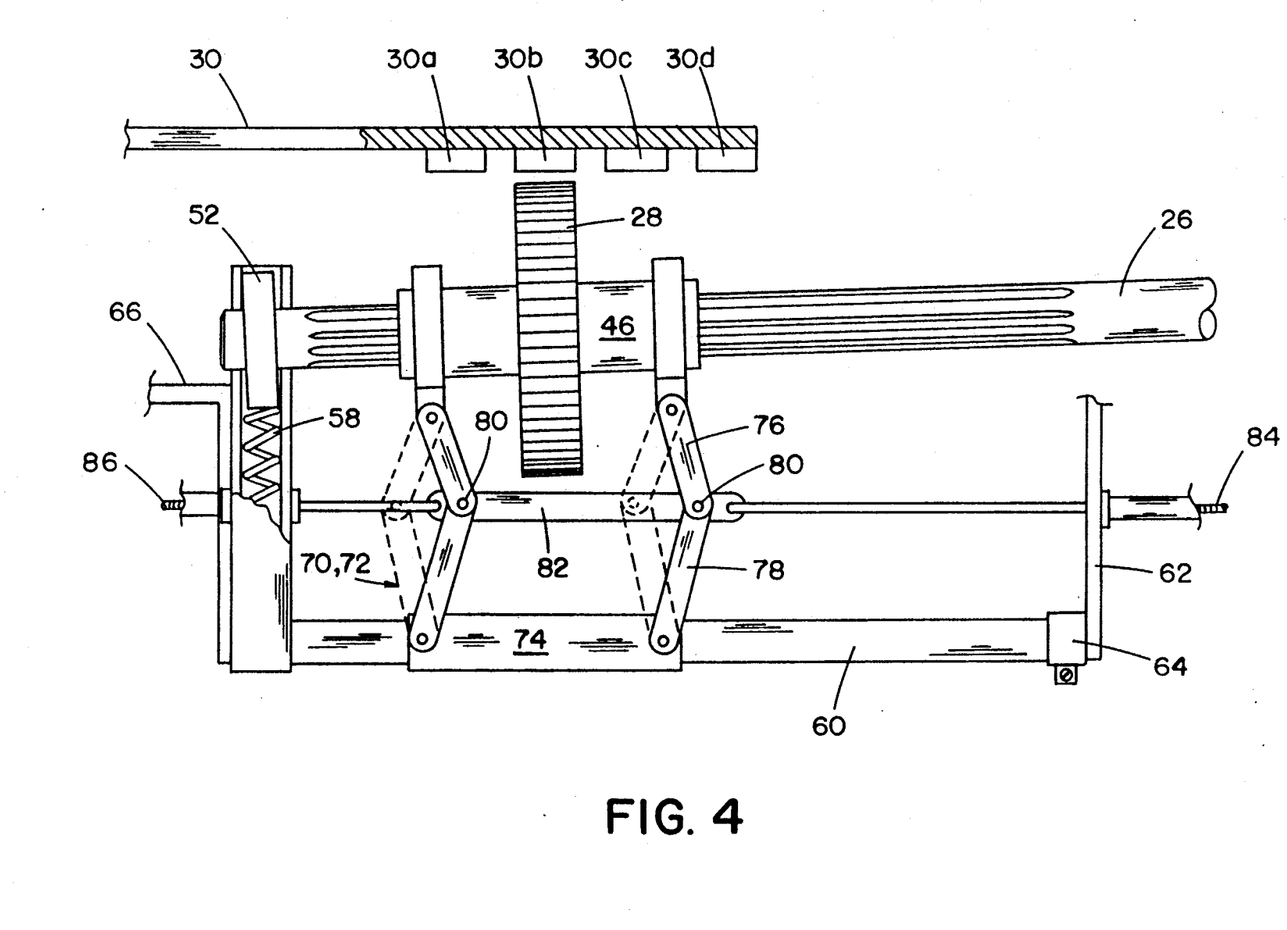
FIG. 4 is a view similar to FIG. 3 showing the mechanism withdrawing the pinion from engagement with the teeth of a ring gear.

The multispeed drive operates in the following manner. With reference to FIGS. 3 and 4, when the links 76 are straight as shown in the FIG. 3 or driving position and there is no tension on the cables 84, 86, the pinion 28 is in engagement with the teeth of a selected ring, in this case 30b, of the driven ring gear set 30. When the rider wishes to change gears, he may do so either at the pedal hub or at the rear wheel or both. For the sake of explanation, reference will be made to changing gears at the rear wheel. The rider tensions cable 84 which causes the links 70, 72 to assume the angled position as seen in FIG. 4 in solid lines. This causes the drive shaft 26, the hub 46 and the pinion 28 to move transversely of the axis of rotation of the shaft 26. The teeth of the pinion 28 move out of engagement with the teeth of the gear ring 30b. At this time, the bearing 52 compresses the spring 58. Continued tension on the cable 84 to the right as seen in FIG. 4 will cause the entire mechanism including the pinion 28, the hub 46, the links 70, 72 and the sleeve 74 (sliding on the rod 60) to the right whereupon the pinion will become aligned with another ring gear, as for example, 30c or 30d. Detents (not shown) in the sleeve 74 or on the hub 46 or at the handlebar controls may be employed to assist in aligning the pinion 28 with each gear ring.

Releasing tension on the cable 84 permits the spring 58 to push the bearing 52 and, hence, the drive shaft 26 and the pinion 28 toward the gear 30 until the teeth of the pinion become engaged with these of the newly selected gear.

In like manner, tension applied to the cable 86 will move the toggles 70, 72 to the dotted line position of FIG. 4. This force pulls the pinion 28 out of engagement with the ring gear and causes the pinion to move to the left until it reaches another selected ring gear, in this case, gear 30a. Release of tension on the cable 86 permits the spring 58 to place the pinion 28 into engagement with the teeth of newly selected ring gear.

We claim:

1. A shaft-driven, multispeed drive for a human-propelled vehicle having at least one drive wheel comprising:
    a driving gear set having a plurality of concentric ring gears operatively secured to pedals;
    a driven gear set having a plurality of concentric ring gears operatively secured to the vehicle's drive wheel;
    a rotatable drive shaft having a pinion on each end, each pinion having means for mounting it for movement axially of the drive shaft for selective engagement, one each, with the ring gears of the driving gear set and the driven gear set, respectively; and
    a pinion control means mounting each pinion for independent movement in a direction transversely of the axis of rotation of the drive shaft into and out of engagement with each ring gear of its associated set.

2. A shaft-driven, multispeed drive for a human-propelled vehicle having at least one drive wheel comprising:
    a driving gear set having a plurality of concentric ring gears operatively secured to pedals;
    a driven gear set having a plurality of concentric ring gears operatively secured to the vehicle's drive wheel;
    a rotatable drive shaft having a pinion on each end, each pinion having means for mounting it for movement axially of the drive shaft for selective engagement, one each, with the ring gears of the driving gear set and the driven gear set, respectively; and
    a drive shaft control means mounting each end of the drive shaft for independent movement toward and away from the teeth of its associated gear set transversely of the axis of rotation of the drive shaft to engage and disengage the pinion with the teeth of a selected ring gear.

3. A shaft-driven, multispeed drive for a human-propelled vehicle having at least one drive wheel comprising:
    a driving gear set having a plurality of concentric ring gears operatively secured to pedals;
    a driven gear set having a plurality of concentric ring gears operatively secured to the vehicle's drive wheel;
    a rotatable drive shaft having a pinion on each end, each pinion having means for mounting it for movement axially of the drive shaft for selective engagement, one each, with the ring gears of the driving gear set and the driven gear set;
    a drive shaft control means mounting each end of the drive shaft for independent movement toward and away from the teeth of its associated gear set transversely of the axis of rotation of the drive shaft to engage and disengage the pinion with the teeth of a selected ring gear; and
    a pair of pinion shifting members for moving each pinion separately on the drive shaft to align the pinion with a selected ring gear and for moving the pinion transversely of the axis of rotation of the drive shaft into engagement with the teeth of the selected gear.

4. A drive according to claim 1 wherein the means for mounting each pinion for movement axially of the drive shaft comprises:
    a hub to which the pinion is secured;
    cooperating splines on the hub and the drive shaft;
    ball bearings interlocking the splines such that the pinion is rotatable driven by the drive shaft and is movable axially of the drive shaft on the ball bearings.

5. A drive according to claim 2 wherein the means for mounting each pinion for movement axially of the drive shaft comprises:
    a hub to which the pinion is secured;
    cooperating splines on the hub and the drive shaft;
    ball bearings interlocking the splines such that the pinion is rotatable driven by the drive shaft and is movable axially of the drive shaft on the ball bearings.

6. A drive according to claim 3 wherein the means for mounting each pinion for movement axially of the drive shaft comprises:
    a hub to which the pinion is secured;
    cooperating splines on the hub and the drive shaft;
    ball bearings interlocking the splines such that the pinion is rotatable driven by the drive shaft and is movable axially of the drive shaft on the ball bearings.

7. A drive according to claim 1 wherein each pinion control means comprises:
    a bearing journaling the drive shaft in a guideway;
    a spring urging the bearing and the drive shaft toward the ring gear of its associated set; and toggle means for pulling the drive shaft away from the ring gear of its associated set against the force of the spring.

8. A drive according to claim 2 wherein each drive shaft control means comprises:
   a bearing journaling the drive shaft in a guideway;
   a spring urging the bearing and the drive shaft toward the ring gear of its associated set; and
   toggle means for pulling the drive shaft away from the ring gear of its associated set against the force of the spring.

9. A drive according to claim 3 wherein each drive shaft control means comprises:
   a bearing journaling the drive shaft in a guideway;
   a spring urging the bearing and the drive shaft toward the ring gear of its associated set; and
   toggle means for pulling the drive shaft away from the ring gear of its associated set against the force of the spring.

10. A drive according to claim 3 wherein each of the pinion shifting members comprises:
   a toggle mechanism operated by cable means for both pulling the pinion away from the concentric ring gear of its associated set and shifting it axially of the drive shaft.

* * * * *